United States Patent
Silva

(10) Patent No.: US 6,863,027 B1
(45) Date of Patent: Mar. 8, 2005

(54) METHOD OF MAKING COCONUT COIR PITCH CAT LITTER FROM POWDER CREATED FROM CRUSHED COCONUT HUSKS

(76) Inventor: Tilak Silva, P.O. Box 477, Gardena, CA (US) 90248-0477

(*) Notice: Subject to any disclaimer, the term of this patent is extended or adjusted under 35 U.S.C. 154(b) by 0 days.

(21) Appl. No.: 10/611,173

(22) Filed: Jul. 1, 2003

(51) Int. Cl.[7] .............................................. A01K 29/00
(52) U.S. Cl. ...................................... 119/172; 119/171
(58) Field of Search ............................... 119/171, 172; 502/400, 401; 241/24.19, 28, 29

(56) References Cited

U.S. PATENT DOCUMENTS

| | | | | |
|---|---|---|---|---|
| 2,168,532 A | * | 8/1939 | McMaym et al. ........... | 426/542 |
| 2,962,234 A | * | 11/1960 | Avila ........................ | 241/273.2 |
| 4,217,858 A | * | 8/1980 | Dantoni ...................... | 119/171 |
| 4,821,677 A | * | 4/1989 | Harrison ..................... | 119/173 |
| 5,209,185 A | * | 5/1993 | Chikazawa .................. | 119/171 |
| 5,229,348 A | * | 7/1993 | Ivie ............................. | 502/401 |
| 5,486,102 A | * | 1/1996 | Ettie et al. ................... | 425/202 |
| 5,927,049 A | * | 7/1999 | Simard ........................ | 53/428 |
| 6,260,511 B1 | * | 7/2001 | Hsu ............................ | 119/172 |
| 6,391,120 B1 | * | 5/2002 | Silva ............................ | 134/7 |
| 2003/0070623 A1 | * | 4/2003 | MacQuoid ................... | 119/171 |
| 2004/0025422 A1 | * | 2/2004 | MacQuoid et al. ............... | 47/9 |

FOREIGN PATENT DOCUMENTS

| | | | | |
|---|---|---|---|---|
| EP | 867112 A1 | * | 9/1998 | .......... A01K/1/015 |
| GB | 2308538 A | * | 7/1997 | .......... B02C/19/00 |
| WO | WO 9412576 A1 | * | 6/1994 | .......... C08L/97/02 |

OTHER PUBLICATIONS

"Prater Material Processing", Prater Industries, Inc., 1994.*
"Prater Flake & Cake Breaker", Prater Industries, Inc.*

* cited by examiner

Primary Examiner—Teri P. Luu
Assistant Examiner—T. Nguyen
(74) Attorney, Agent, or Firm—Edwin H. Crabtree; Ramon L. Pizarro; Donald W. Margolis

(57) ABSTRACT

A method of making pellets of coconut coir pith used as cat litter. The coconut coir pith is nontoxic, lightweight and creates very little dust when compared to other cat litter products. Also, the coir pith pore structure absorbs all of the cat urine and doesn't release any of the typical cat urine smell to the atmosphere. In the method of making cat litter pellets from powdered coir pith, the first step includes crushing coconut husks and mixing the residual powdered coconut coir pith with water. The coir pith and water mixture is then compressed through a die having a plurality of $\frac{1}{8}^{th}$ inch diameter holes therein for creating spaghetti like strings of coir pith. The strings of coir pith are then cut to a length of ½ inches or less. The pellets are heated in an oven for removing moisture and hardening them. The harden pellets are then packaged for shipment to customers.

14 Claims, 3 Drawing Sheets

US 6,863,027 B1

METHOD OF MAKING COCONUT COIR PITCH CAT LITTER FROM POWDER CREATED FROM CRUSHED COCONUT HUSKS

BACKGROUND OF THE INVENTION (a) Field of the Invention This invention relates to the coir pith cat litter and more particularly, but not by way of limitation, to a method of making powder, granules and pellets of coconut coir pith cat litter from residual powder created from crushing coconut husks.

(b) Discussion of Prior Art

Heretofore, long fibers from crushed coconut shells have been a residual byproduct for making fiber ropes, mats, mattresses, brushes, filters and other products. Also, coconut coir pith is used for absorbing oil spills on land and water. Further, coir pith is used as an absorbent for holding moisture in soils used in landscaping and gardens.

In U.S. Pat. No. 5,860,391 to Maxwell et al., various types of absorbent materials are disclosed and used in conjunction with activated carbon. One of these types of absorbent materials uses reactivated coconut carbon. The coconut carbon provides an odor absorbing material. In U.S. Pat. No. 5,819,688 to Walker, an odor adsorbing and liquid absorbing mat is described. The mat is used with pets. The mat can be made of different types of fibers including the use of fiber from coconut shells. In U.S. Pat. No. 6,189,260 to Kusey et al., coconut coir pith is disclosed for mixing with peat moss. The mixture is used for retaining moisture in soil during plant growth. In U.S. Pat. No. 5,458,662 to Toyone, a process is disclosed for compressing raw coconut outer husks. The compressed coconut husks are used as a planting material in flowerpots. In U.S. Pat. No. 3,703,464 to Ferm, the use of coconut husks to treat oil spills is described.

None of the above mentioned prior art patents specifically disclose the unique features, structure and method of making coconut coir pith cat litter from powder created from crushed coconut shells.

SUMMARY OF THE INVENTION

In view of the foregoing, it is a primary objective of the subject invention to provide a method of making powder, granules and pellets of coconut coir pith cat litter, which is nontoxic, lightweight and creates very little dust when compared to other cat litter products. Also, the new cat litter is more effective when compared to other cat litter products, such as clay granules.

A key object of the new coconut coir pith cat litter product is by the nature of the coir pith pore structure, the cat litter absorbs all of the cat urine and doesn't release any of the typical cat urine smell to the atmosphere. Therefore, the new cat litter prevents an unpleasant smell inside a home or office where a cat or cats reside.

Another object of the coir pith cat litter is it quickly absorbs urine and other moisture preventing evaporation into the surrounding atmosphere. The cat litter is packaged as a powder, granules and pellets for giving a customer a choice in application.

In a method of making coconut coir pith cat litter pellets from powdered coir pith, the first step includes crushing coconut husks and mixing the residual powdered coconut coir pith with water. The coir pith and water mixture is then compressed through a cylindrical or square die having a plurality of $\frac{1}{8}^{th}$ inch diameter round or square holes therein. The die with round or square holes creates elongated spaghetti like strings of coir pith. The strings of coir pith are then cut to a length of ½ inches or less for creating pellets or cubes. The coir pith pellets or cubes are then conveyed through an oven for removing moisture and hardening them. The harden pellets or cubes are then cooled and packaged in plastic or paper bags for shipment to wholesale and retail customers.

These and other objects of the present invention will become apparent to those familiar with various types of cat litter and methods of making cat litter when reviewing the following detailed description, showing novel construction, combination, and method steps as herein described, and more particularly defined by the claims, it being understood that changes in the embodiments disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
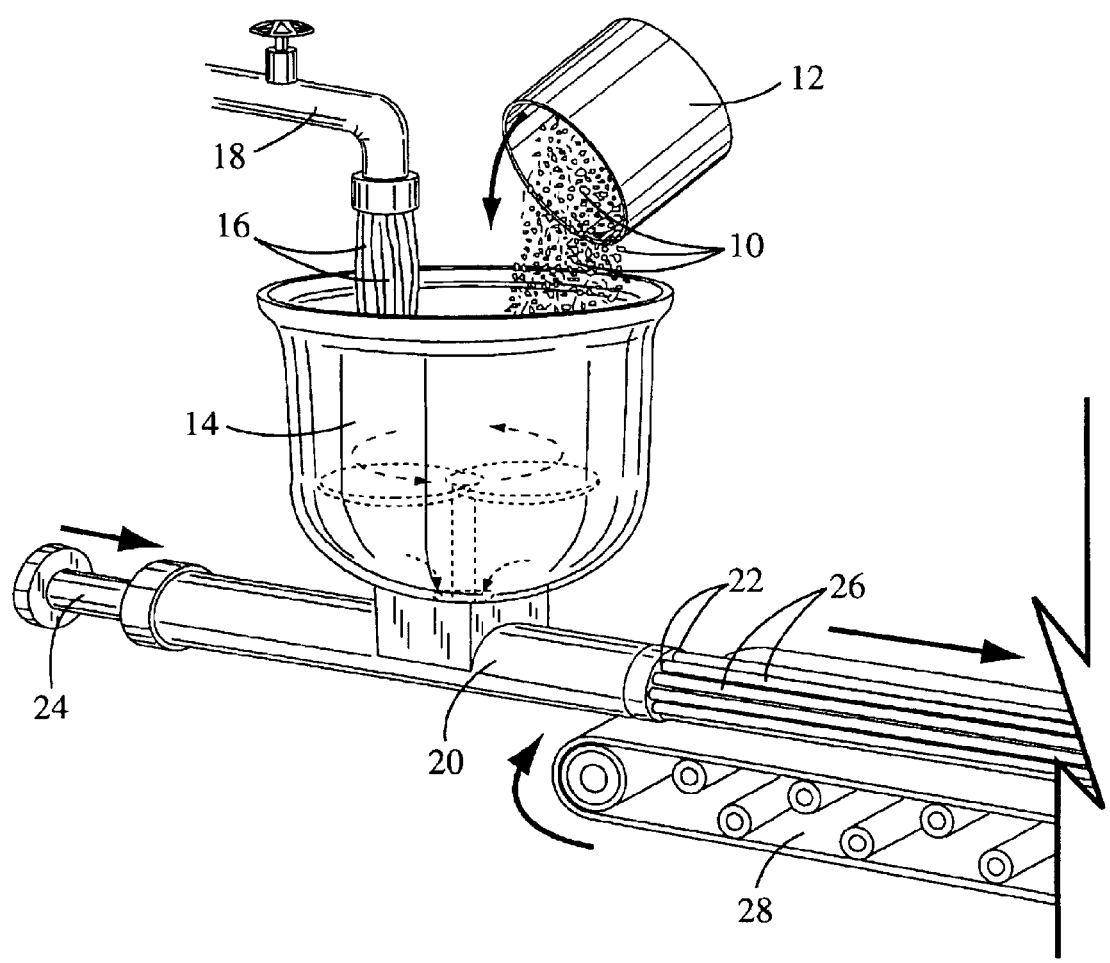
FIG. 1 illustrates a perspective view of powdered coconut coir pith being poured into a mixing bowl or tank and mixed with water from a water tap. The coir pith and water mixture are compressed through a cylindrical or square die with $\frac{1}{8}^{th}$ inch round or square die holes. The die is shown creating spaghetti like strings of coconut coir pith received on a conveyor belt.

In FIG. 1, a method of making pellets of coconut coir pith cat litter is illustrated. In this drawing, a perspective view of powdered coconut coir pith 10 is shown being poured from a container 12 into a mixing bowl 14 and mixed with water 16 from a water tap 18. The coir pith and water mixture are discharged into the top of a cylindrical die 20 with $\frac{1}{8}^{th}$ inch round diameter die holes 22. Using a piston 24, mounted in one end of the cylindrical die 20, the mixture is pushed through the die holes 22 creating spaghetti like strings 26 of coconut coir pith, which is received on one end of a first conveyor belt 28. The die 20 can also be a square die with square holes 22 for creating coir pith cubes.

Figure 2:
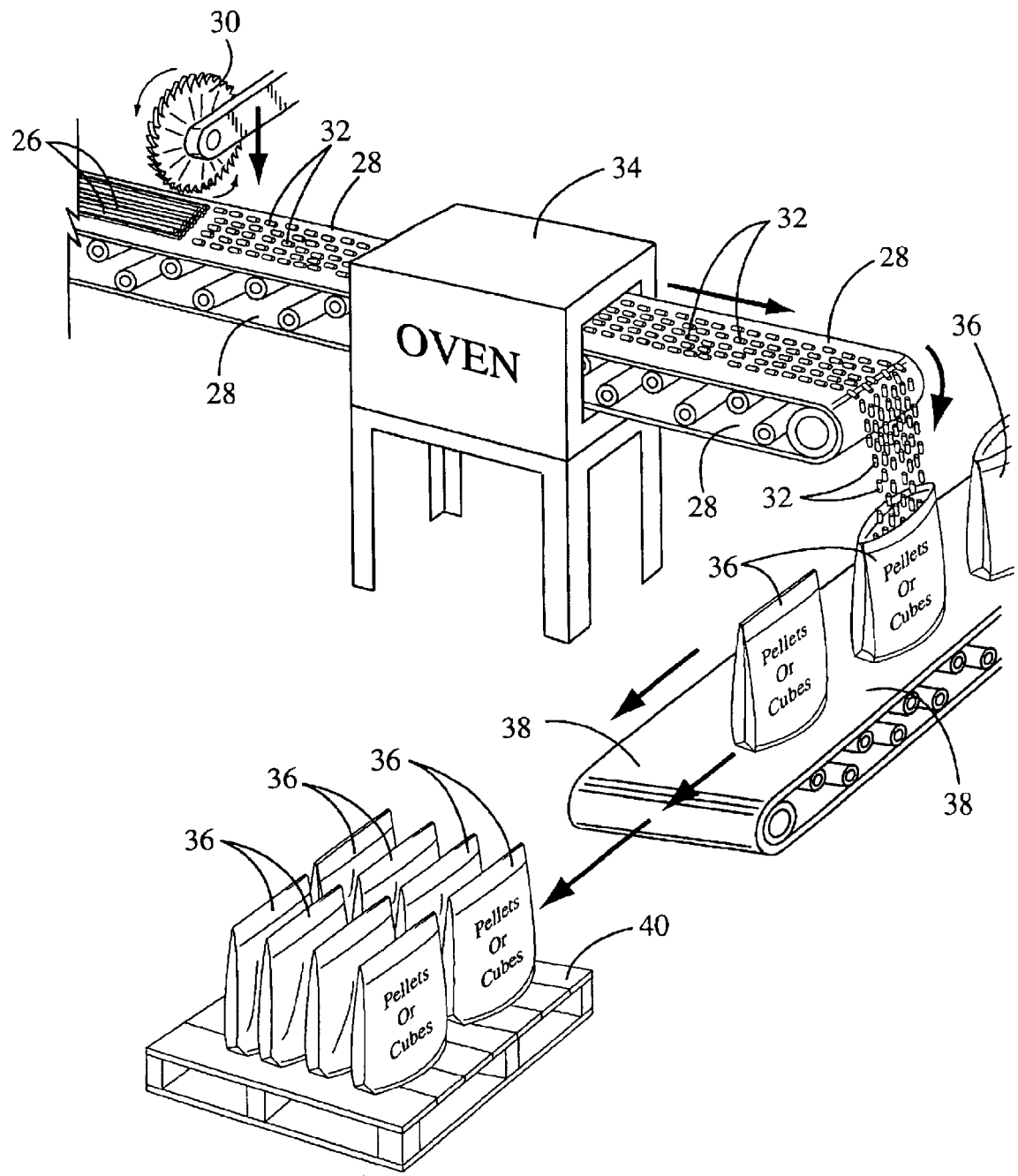
FIG. 2 illustrates a perspective view of the strings of coir pith being cut by a slow moving saw into pellet lengths of less than ½ inch. Also, the saw can be used for cutting the strings of coir pith into cubes. The dried pellets or cubes are conveyed through an oven for removing moisture and hardening the pellets or cubes. In this drawing, pellets are shown being dropped from the end of the conveyor belt into a package for shipment to wholesale and retail customers.

In FIG. 2, a perspective view of the strings 26 of coir pith are shown being cut by a slow moving saw 30. The saw 30 cuts the strings 26 into pellets 32 having lengths of ½ inch and less. While not shown in the drawings, square strings 26 of coir pith from a square die can be cut using the saw for creating coir pit cubes. The pellets 32 or cubes are now conveyed through a first oven 34 for removing moisture and hardening. The pellets or cubes are then transported to the end of the first conveyor belt 28 and dropped into a package 36 transported on a second conveyor belt 38. The second conveyor belt 38 is shown transporting a plurality of packages 36 for receipt on a wooden pallet 40. The wooden pallet 40 is used for shipment of the packages 36 of the coconut coir pith pellets 34 or cubes to wholesale and retail customers.

Figure 3:
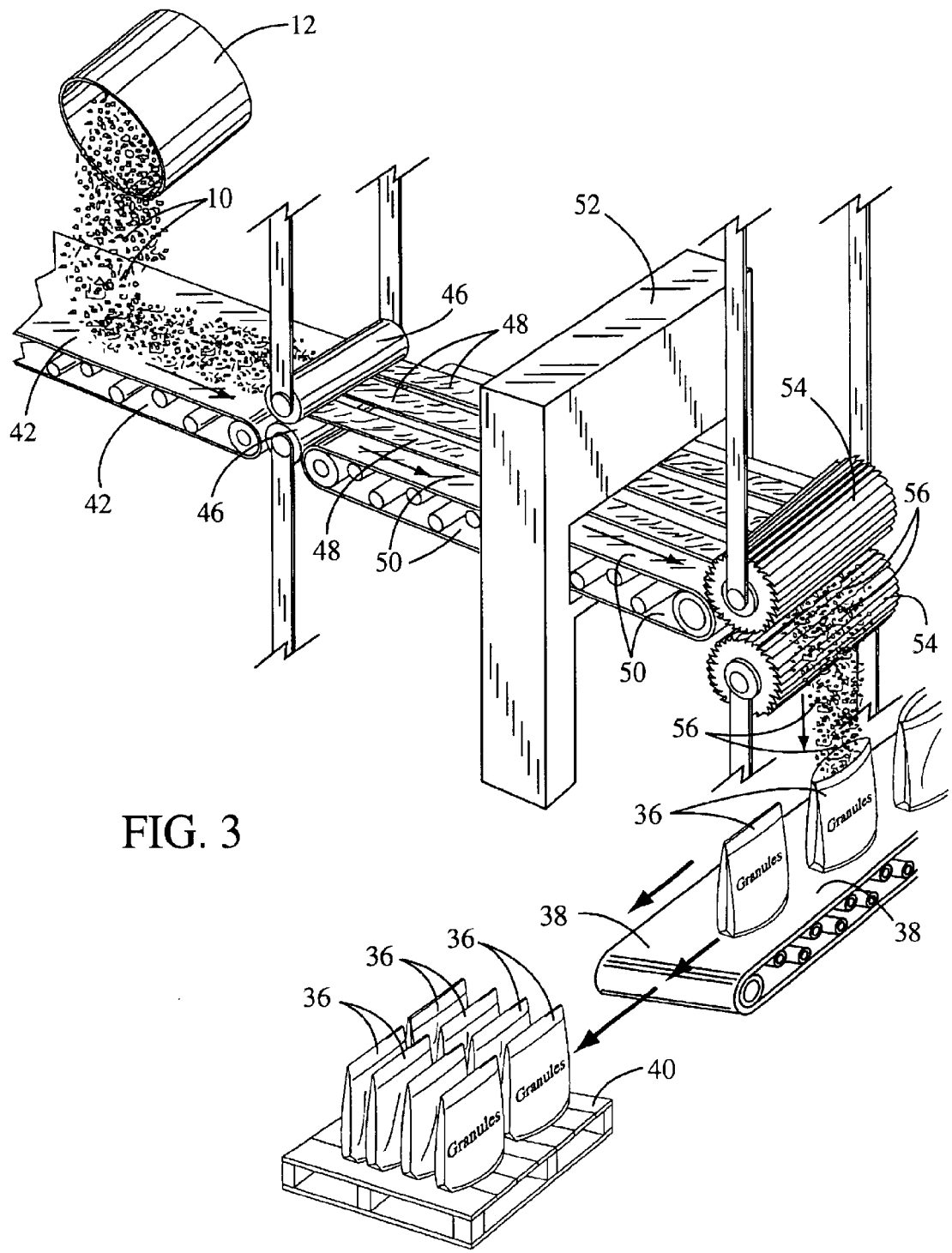
FIG. 3 illustrates a perspective view of a pair of rollers compressing powdered coconut coir pith into coir pith sheets. The sheets are conveyed on a conveyor belt through an oven to remove any moisture in the sheets. The dried sheets are then transported through a pair of crushers, which crush the coir pair sheets into granules of $\frac{1}{8}^{th}$ inch and less.

In FIG. 3, a method of making granules of coconut coir pith cat litter is illustrated. In this drawing, a perspective view of a third conveyor belt 42 is shown for receiving powdered coir pith 10 from the container 12 and transporting the coir pith 10 into a pair of rollers 46. The rollers 46 are used to compress the powdered coconut coir pith 10 into coir pith sheets 48. The sheets 48 are then conveyed on a fourth conveyor belt 50 through a second oven 52 to remove any moisture and hardened the sheets. The coir pith sheets 48 are now transported to the end of the fourth conveyor belt 50 and feed into a pair of crushers 54. The crushers 54 crush the coir pair sheets 48 into granules 56 of $\frac{1}{8}^{th}$ inch and less. The granules 56 are now dropped into a package 36 received on the second conveyor belt 38. The package 36 is conveyed to the end of the conveyor belt 38, where it is discharged onto a wooden pallet 40, similar to the pellet packages 36 on the pallet 40 shown in FIG. 2.

In a third method of making coconut coir pith cat letter, the coir pith powder 10, as shown in FIG. 1, is obtained by crushing the coconut husks 44 and removing the residual powdered coir pith. The coir pith powder 10 is then screened to removing any foreign particles and coconut fibers. The powder 10 is then dried in an oven similar to the ovens shown in FIGS. 2 and 3. After the powder is dried, it then placed in the package 36 for shipment.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A method of making coconut coir pith pellets for cat litter from powdered coconut coir pith, the steps comprising:

crushing coconut husks and removing residual powdered coir pith;

screening the residual powdered coir pith and removing foreign particles and coconut fibers;

mixing the powdered coir pith with water;

compressing the mixture of powdered coir pith and water into strings of coir pith;

cutting the strings of coir pith into coir pith pellets to a length of $V_2$ inches and less;

drying moisture from the coir pith pellets; and packaging the dried coir pith pellets for shipment to a customer.

2. The method of making coir pith pellets as described in claim 1 wherein the step of compressing the mixture of powdered coir pith includes compressing the mixture through a cylindrical die having a plurality of $\frac{1}{8}^{th}$ inch diameter holes therein, the cylindrical die with holes creating elongated spaghetti like strings of coir pith.

3. The method of making coir pith pellets as described in claim 2 wherein the plurality of holes in the cylindrical die have a $\frac{1}{8}$ inch diameter for creating the strings of coir pith.

4. The method of making coir pith pellets as described in claim 1 wherein the step of cutting the strings of coir pith into pellets includes cutting the strings using a saw.

5. The method of making coir pith pellets as described in claim 1, wherein the step of drying the coir pith pellets includes drying the coir pith pellets in an oven.

6. The method of making coir pith pellets as described in claim 5 wherein the step of drying the coir pith pellets in the oven includes hardening the pellets in the oven and then cooling the pellets prior to the step of packaging.

7. The method of making coir pith pellets as described in claim 1 wherein dried and hardened pellets are packaged in plastic and paper bags for shipment to customer.

8. A method of making coconut coir pith pellets for cat litter from the steps comprising:

crushing coconut husks and removing residual powdered coir pith;

screening the residual powdered coir pith and removing foreign particles and coconut fibers;

mixing the powdered coir pith with water;

compressing the mixture of powdered coir pith and water into strings of coir pith;

cutting the strings of coir pith into coir pith cubes;

drying moisture from the coir pith cubes; and packaging the dried coir pith cubes for shipment to a customer.

9. The method of making coir pith pellets as described in claim 8 wherein the step of compressing the mixture of powdered coir pith includes compressing the mixture through a square die having a plurality of square holes therein, the square die with holes creating elongated spaghetti like strings of coir pith.

10. The method of making coir pith pellets as described in claim 9 wherein sides of the plurality of square holes in the square die are $\frac{1}{8}$ inch for creating square strings of coir pith.

11. The method of making coir pith pellets as described in claim 8 wherein the step of cutting the strings of coir pith into cubes includes cutting the strings using a saw.

12. The method of making coir pith pellets as described in claim 8 wherein the step of drying the coir pith cubes includes drying the coir pith cubes in an oven.

13. The method of making coir pith pellets as described in claim 12 wherein the step of drying the coir pith cubes in the oven includes hardening the cubes in the oven and then cooling the cubes prior to the step of packaging.

14. The method of making coir pith pellets as described in claim 8 wherein dried and hardened cubes are packaged in plastic and paper bags for shipment to customer.

* * * * *